US007260833B1

(12) United States Patent
Schaeffer

(10) Patent No.: US 7,260,833 B1
(45) Date of Patent: Aug. 21, 2007

(54) ONE-WAY NETWORK TRANSMISSION INTERFACE UNIT

(75) Inventor: Dennis Schaeffer, Aston, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 775 days.

(21) Appl. No.: 10/622,173

(22) Filed: Jul. 18, 2003

(51) Int. Cl.
*G06F 15/16* (2006.01)

(52) U.S. Cl. .............................. 726/3; 726/11; 726/12; 726/14; 713/153; 713/154; 709/238; 709/239; 709/240; 709/241; 709/242; 709/243; 709/244

(58) Field of Classification Search ................ 709/234, 709/232, 238–244; 726/3, 11–12, 14; 713/153–154
See application file for complete search history.

(56) References Cited

U.S. PATENT DOCUMENTS 6,327,242 B1 * 12/2001 Amicangioli et al. ....... 370/216
6,363,489 B1 * 3/2002 Comay et al. ................ 726/22
6,584,444 B1 6/2003 Tello et al.
6,584,568 B1 6/2003 Dircks et al.
2002/0032871 A1 * 3/2002 Malan et al. ............... 713/201
2002/0065566 A1 * 5/2002 Aronson et al. .............. 700/91
2002/0106018 A1 * 8/2002 D'Luna et al. ........ 375/240.01
2002/0153998 A1 * 10/2002 Litwin et al. .......... 340/310.01
2003/0084334 A1 * 5/2003 Miyao et al. ............... 713/200
2004/0015721 A1 * 1/2004 Eastlake, III ............... 713/201
2004/0039938 A1 * 2/2004 Katz et al. .................. 713/201

OTHER PUBLICATIONS

Schaeffer, Dennis, "Distribution of Ship Control System Status over External Networks by Unhackable UDP Single Fiber Transmission" Paper presented at the Thirteenth International Ship Control Systems Symposium (SCSS), Orlando, FL, Apr. 7-9, 2003.

* cited by examiner

*Primary Examiner*—Kim Vu
*Assistant Examiner*—Baotran To
(74) *Attorney, Agent, or Firm*—Howard Kaiser; Steven W. Crabb

(57) ABSTRACT

A network isolation apparatus is provided that permits data to be sent to a remote computer or network without a return path so that the isolated sensitive network may not be compromised. The isolation device spoofs the network so that the network believes it has a fully functional external connection. The invention has a first media converter for receiving data from a workstation on a sensitive network; this data is then passed to a second media converter and then transmitted to a remote computer. An optical signal generator sends signals to the workstation to imitate a standard transmit and receive connection, and also sends signals to the second media converter to imitate a standard transmit and receive connection. No physical connection exists for the remote computer workstation to compromise the sensitive network.

20 Claims, 4 Drawing Sheets

20
24
22
10
36
34
RX
RX
TX
32
40

ONE-WAY NETWORK TRANSMISSION INTERFACE UNIT

STATEMENT OF GOVERNMENT INTEREST

The invention described herein may be manufactured and used by or for the Government of the United States of America for governmental purposes without payment of any royalties thereon or therefore.

BACKGROUND OF THE INVENTION

Information networks that interconnect numerous computational resources have proliferated into all aspects of society. These networks contain vast amounts of information, some of which is sensitive. These networks typically include several host computer systems or servers that are interconnected over a local area network (LANs) to individual workstations and other network resources. Some of the additional network resources may include various data acquisition units (DAUs) or programmable logic controllers (PLCs) that not only provide data, but also are able to control equipment remotely or automatically. As long as these resources stay local there is a controllable amount of risk to the LAN and any equipment that is connected that could be caused by a malfeasant or hacker. The amount of risk posed to sensitive networks increases greatly if these LANs are also interconnected to wide area networks (WANs) that include public networks such as the World Wide Web and the Internet.

There are many different types of hardware, software and communication protocols used in workstations, DAUs, PLCs, and networks. The prevalence of distributed network enterprise systems has created an increased need for computer security. There is a wide range of security measures that may be taken to ensure effective security. Among the most common are intrusion detection systems (IDS), firewalls and antivirus programs that attempt to identify hackers or intruders to systems and prevent any harm to the computer systems. These systems are usually software or a combination of hardware and software that must be configured for specific types of networks and computer systems. For example, the system installed on a UNIX based server would not necessarily be the same or even compatible with a Windows NT based server. It is also imperative that such protections be frequently updated to continue the back and forth battle between hackers and system administrators as no firewall prevents all attacks and is unable to combat some types of attacks such as denial of service attacks.

These types of protections can provide a good level of security and may be enhanced by good security policy and practice, but configuring and maintaining security applications can be extremely complicated, time consuming and resource intensive. Even security applications that were initially excellent often fail as time passes due to failures caused by hardware changes, missing security patches, and more sophisticated hackers. Short of simply not connecting to external computers or networks there is always a risk posed by outside hackers.

Some systems contain such sensitive data or operate critical equipment that the risk posed by hackers is simply too great to allow the system to be connected to external networks even though it would be extremely beneficial and efficient to do so. What is needed is a protection system that would allow the protected system to send data out to external networks, workstations, or other computers but not permit any possible attack from external malefactors.

SUMMARY OF THE INVENTION

The present invention provides a sensitive network isolation apparatus that permits data to be sent to a remote computer or network without a return path so that the remote computer or network is not able to compromise the isolated sensitive network. The isolation device spoofs the network so that the network believes it has a fully functional external connection. The invention has a first media converter for receiving data from a workstation on a sensitive network, this data is then passed to a second media converter and then transmitted to a remote computer. An optical signal generator sends signals to the workstation to imitate a standard transmit and receive connection, and also sends signals to the second media converter to imitate a standard transmit and receive connection. No physical connection exists for the remote computer workstation to compromise the sensitive network.

For a better understanding of the present invention, together with other and further objects thereof, reference is made to the following description, taken in conjunction with the accompanying drawings, and its scope will be pointed out in the appended claims.

DESCRIPTION OF THE PREFERRED EMBODIMENT

Figure 1:
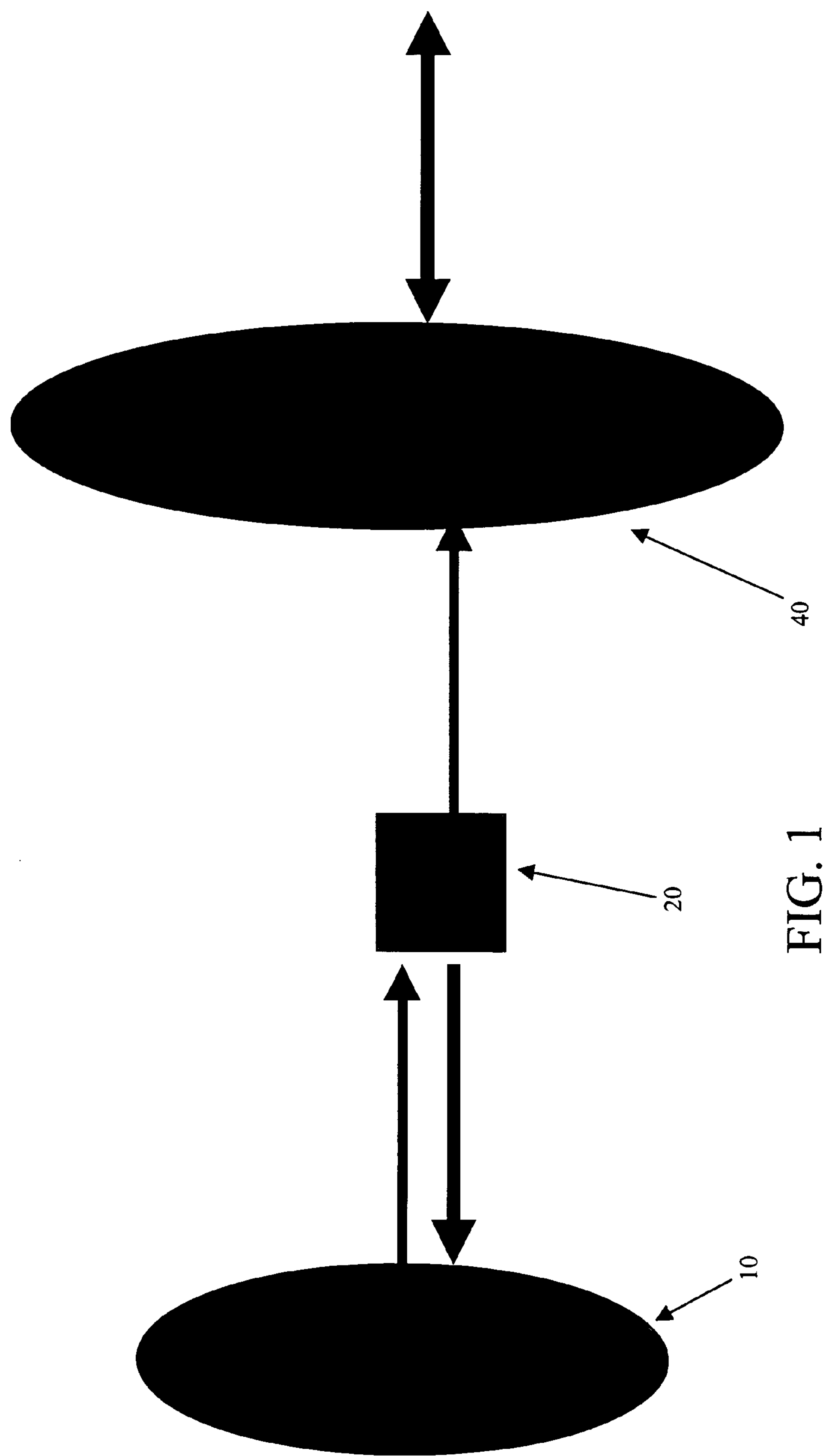
FIG. 1 is a graphical representation of an example of the present invention illustrating the data paths.

Referring now to the example of FIG. 1, the one-way network isolation box 20, also called the Denbox, lets data flow from the mission critical or sensitive network 10 to an external or remote network 40 or workstation. Because there is no return path for the external network 40 to send data or commands back to the sensitive network 10, there is no possibility of disruption on the sensitive network 10. The sensitive network 10 is fooled into thinking that a fully functional datalink is present.

Figure 2:
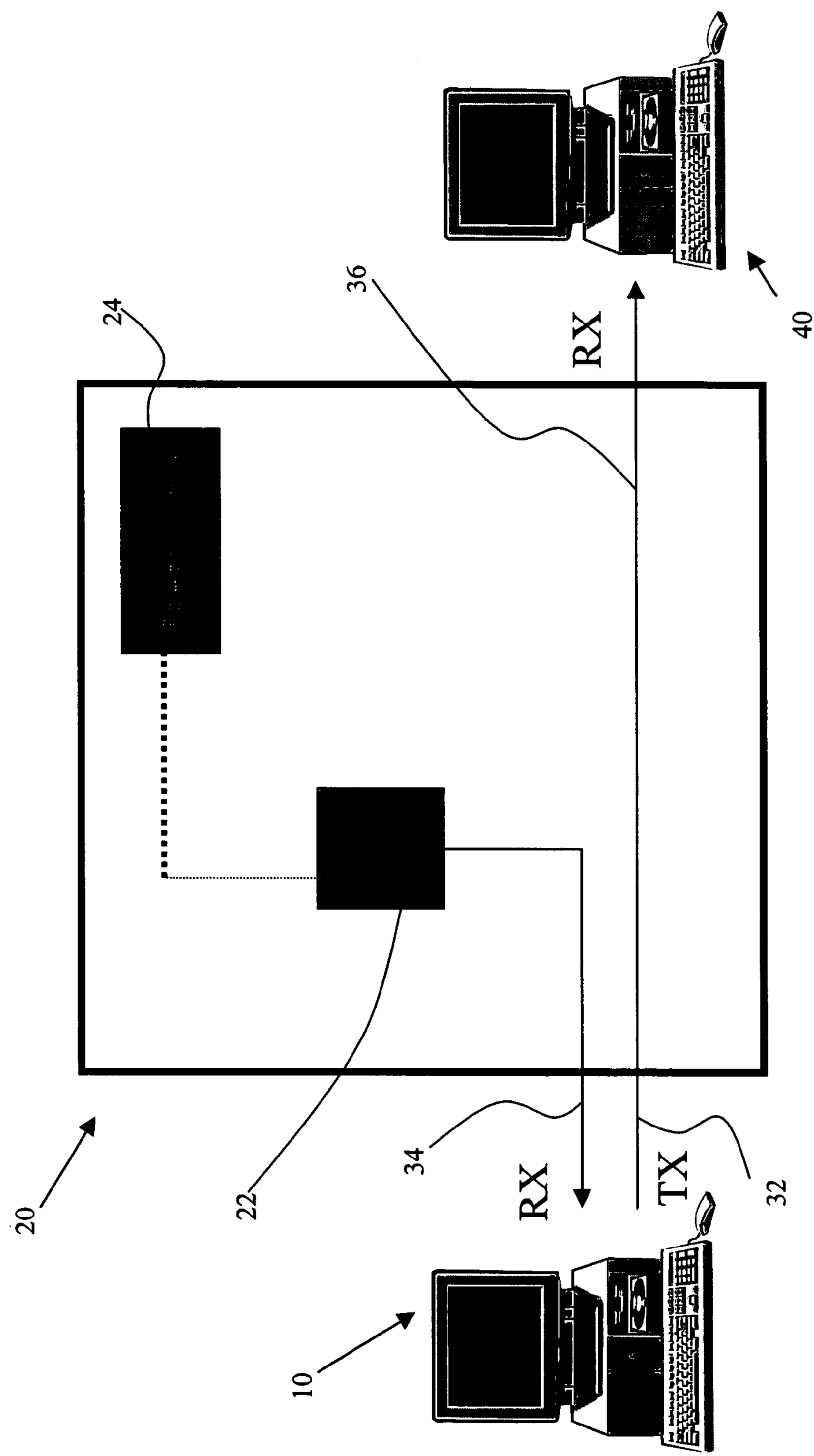
FIG. 2 is a schematic of an example of the present invention.

In a basic example of the present invention, shown in FIG. 2, the sensitive workstation 10, part of a larger network, would transmit data 32 through the isolation box 20 and out to a remote workstation 40. In order for such transmissions to be sent normally, the sensitive workstation 10 must be fooled into recognizing a connection that does not in fact exist. This is accomplished by having a signal generator 22 to send an idle signal on a data line 34 to the receive port of the workstation 10. The signal generator 22 is preferably an optical idle signal generator that conforms to IEEE 802.3 and transmits either 850 nm or 1300 nm signals to the workstation 10 depending on the Network Interface Card (NIC) used by the workstation. The preferred mode of communication is connectionless protocol such as User Datagram Protocol (UDP) as described in Request For Comments (RFC) 768. The UDP is then encapsulated into an Internet Protocol (IP) datagram pursuant to Request For Comments (RFC) 791 for transmission.

Figure 3:
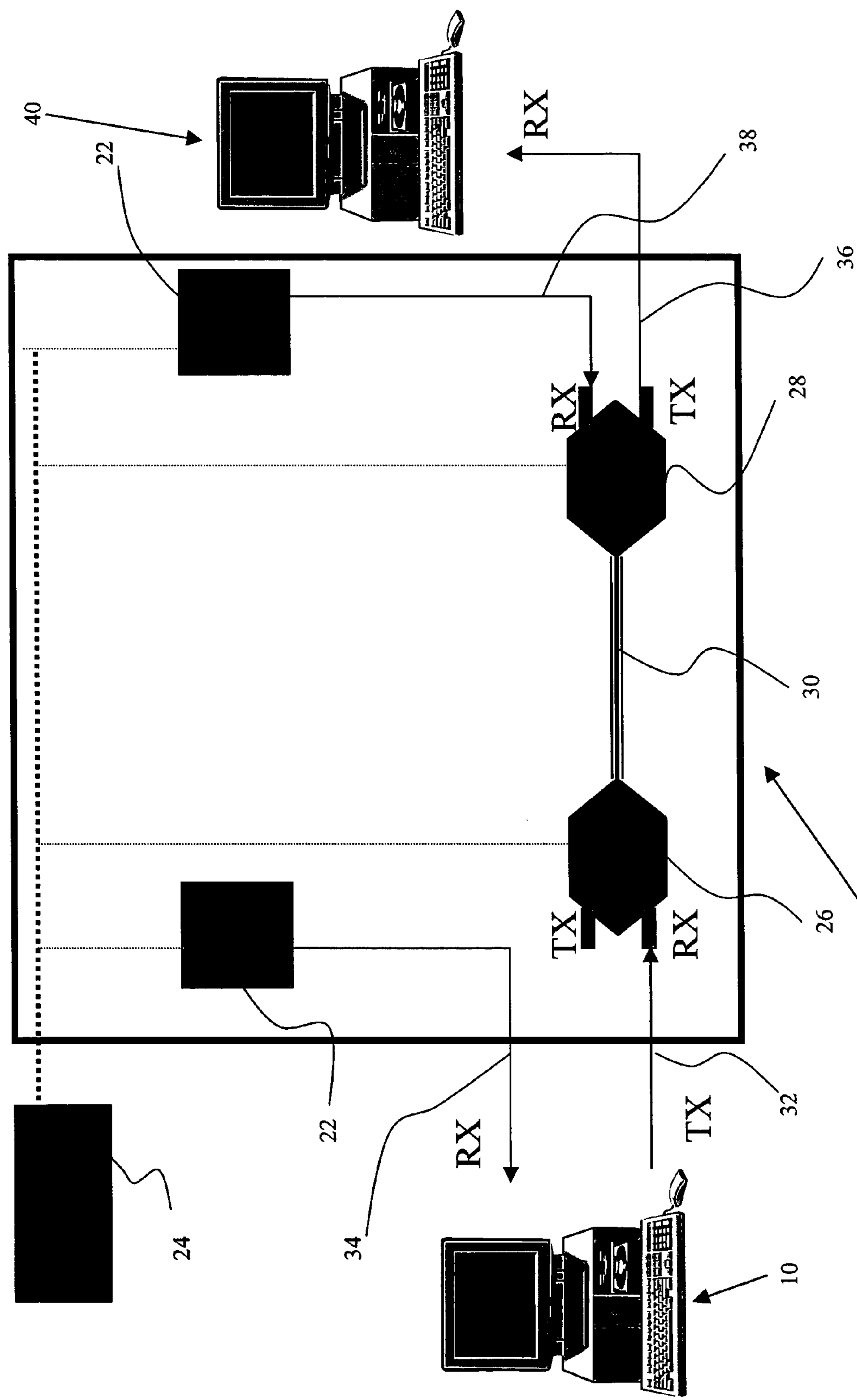
FIG. 3 is a schematic of an alternative example of the present invention.

FIG. 3 is a further embodiment of the present invention 20 showing a decoupled transmission path 30 to provide additional isolation to the data line 32 from the sensitive network 10 to the remote network 40. UDP is a connectionless protocol, there is no handshaking or acknowledgment by the receiving device that the information was received provided by the UPD protocol, it is possible for higher-level software applications to perform these tasks if required. The data is simply broadcast out, and if a single package is lost or corrupted in transit it will not be re-transmitted. In operation this would be acceptable, as the next data package would be following within a couple hundred milliseconds. In operation the workstation 10, usually part of a network or control station, transmits data on line 32 to a first media converter 26. The media converter takes an ethernet signal that is being transmitted in one format, for example 10 Base T over copper cabling, into an ethernet signal that is transmitted in a different media, for example 10 Base F over optical fiber. The data packet is then transmitted over a short span of cable 30, such as ten (10) base T or other suitable cable, to a second media converter 28 and then over transmission line 36, preferably fiber for better isolation, to a remote workstation 40. This workstation 40 may be a standalone unit or part of a network. In order for the network communications to operate correctly, the protected network 10 must be spoofed to believe there is an active connection. This is accomplished by including an optical idle signal generator 22 that transmits signals over fiber 34 to the network switch of the workstation 10 depending on the NIC card used by the workstation. The wavelengths for the different speeds are specified by IEEE 802.3 10 Base F is 850 nm and 100 Base F is 1300 nm; they are not compatible or interchangeable with each other; the Denbox 20 for 10 Base F will use different media converters than the Denbox 20 for 100 Base F. The optical generator 22 is powered by power supply 24, which may be external to the isolation box 20 or contained within. The second media converter 28 must also be spoofed by the signal generator 22 that sends an idle signal over fiber 38 to the receive port of the second media converter 28. One of the features that makes the present invention so useful is that once installed the protected network may send data out and have no risk of outside compromise, and no updates need ever be preformed. Additionally, the Denbox 20 operates independently of the hardware on either side, therefore obviating the need for upgrades in most cases as the Denbox 20 is compatible with any vendors NIC card or any vendors network switch. If the system stays with one format ie 10 Base F, no changes to the Denbox 20 need occur. If the media is changed, for example from 10 base F to 100 base F, then a 100 Base F Denbox 20 would be required.

EXAMPLE

Many current Naval Shipboard Control Systems are being designed and installed with environmentally packaged commercial off the shelf (COTS) network switches to provide distributed control data distribution. The networks utilize Data Acquisition Units (DAU), typically PLC and/or VME bus, to interface with machinery and sensors. The DAU's process the raw sensor information via their native microprocessor and software into digital data that can be packaged into an IP datagram and distributed via an Ethernet connection throughout a network. The DAU's are capable of interfacing and processing various inputs including temperature, pressure, level, speed, vibration, position, torque, flow, voltage, current, frequency, and phase. The DAU's also provide the closed loop control of machinery by controlling motorized valves etc.; the DAU's provide the physical connection to machinery and the actual "control" of the machinery is performed by the DAU. The DAU sends the sensor and system status over the network multiple times a second depending on the particular systems being monitored. The processed sensor information is broadcast over a network to various workstations. The workstations provide the control system status to operator personnel to allow them to control and monitor the real-time status of mission critical control systems including main propulsion, electric plant generation and distribution, damage control, navigation and steering, fuel level and transfer, and ballast control. The workstation software receives the data from the DAU over the network, reads the information from the data packet and interprets the data to determine the status that is then presented on various Human-Machine-Interface (HMI) pages on workstations. The information conveyed includes machinery sensor status (processed by the DAU), as well as alarm indications that are contained within the workstation software. The machinery operators also input control commands via the HMI page, which the workstation then sends over the network to the DAU; the DAU then implements the control command.

The network that the DAU's and workstations connect to consists of multiple rugged COTS network switch chassis. The switch chassis provides power supplies, a communications backplane, and slots for various modules including the switch processor modules that contain the operating system and switch configuration software, and network interface modules that provide the interface points to the switch chassis for the DAU's, workstations, and other switches. There are various switch interface modules available from the switch vendors to support most if not all of the available network protocols such as Ethernet, Token Ring, ATM; as well as emerging support for native telephony devices. The switch-to-switch connections (backbone) are typically high speed OC-3c or OC-12c ATM; with gigabit Ethernet emerging as the newest best cost/performance switch-to-switch network protocol. The backbone physical media is either multimode optical fiber for OC-3c installations or singlemode optical fiber for OC-12c or gigabit Ethernet. Each of the mission critical edge devices (DAU/workstation) have two independent connections to separate network switches to prevent loss of control resulting from a single network switch casualty. The DAU and workstation connections are typically Ethernet over multimode optical fiber; current installations include 10 megabit Ethernet over fiber, and 100 megabit Ethernet over fiber. There are multiple currently in-service U.S. Navy ships with Hull, Mechanical & Electrical (HM&E) control system networks that utilize the DAU/workstation/COTS switch system architecture described. The DAU's are chassis that have interface cards, Field Transition Modules (FTM), that accept various signal types including voltage, current, frequency etc. The example network consists of 4 network switches with a full-mesh OC-12c ATM backbone connecting the switches together. The Data Acquisition Equipment (consisting of two or more DAU's) and workstations have 10-megabit per second Ethernet connections over multimode fiber to two separate network switches. The DAU's and workstations are distributed throughout the ship and control all major HM&E systems on the ship including main propulsion, electric plant generation and distribution including switchboard and shore power interface, paralleling generator etc., damage control including fire and flooding detection, fire pump control; the ship also has an Integrated Bridge System that performs navigation and steering control, and also has an interface to main propulsion control. The information that each DAU monitors is broadcast over the network multiple times each second. Each networked DAU has an IP address that identifies it as the source of the information.

The digital data that each DAU produces is sent via an Ethernet broadcast to every workstation and all other devices including other DAU's that are connected to the network. The digital data is packaged by the DAU software into a UDP datagram per RFC 768. The UDP datagram includes the digital data plus overhead information including 16 bit source and 16 bit destination software "ports", a 16 bit field with the length of the UDP datagram, and a 16 bit checksum. UDP is a connectionless protocol, there is no handshaking or acknowledgment by the receiving device that the information was received provided by the UDP protocol, it is possible for higher level software applications to perform these tasks if the particular application requires it. The data is simply broadcast out, and if a single package is lost or corrupted in transit it will not be re-transmitted. The system architecture is designed to broadcast a complete data package for each DAU multiple times each second so if a single package is lost, another complete set of data will be sent within a couple hundred milliseconds. The UDP datagram is then encapsulated by the system software into an Internet Protocol (IP) datagram per RFC 791. The IP datagram can be broken into two parts, the header and the data. The header includes fields that identify what higher level protocol is being carried (in this case, UDP), the total length of the IP datagram, the length of the IP header (so that the beginning of the data can be identified), various "flags" that are used by network devices to handle the IP datagrams. The header also contains a checksum as well as the source address (the IP address of the DAU) and the destination address. In the Integrated Ship Controls (ISC) system, all of the DAU data transmissions are sent via a broadcast. The IP broadcast destination is the network # with the node identified as all 1's; in the case of ISC which has a class C address, the broadcast address is the network#. 255 which is 1111 1111 in binary. The ISC network address is a non-routable IP address 192.168.1 and the broadcast address is 192.168.1.255. The IP datagram is then encapsulated in an Ethernet packet and sent out on the network. All of the System information that is distributed by the ISC DAU's is contained in the 7,169 signals which when multiplied by the bits/signal equals a total of 25,833 bits. The information available on the ISC network includes all of the status of the ships machinery control system as well as the damage control status of the ship and fuel levels etc. This information may be used by external users for condition based maintenance via predictive expert software packages, troubleshooting, that are interested in the engineering data available on the network. The information may be of use to theater and battle group commanders in as much as the data also contains high level insight as to the total "health" capabilities and status of the ship as a whole.

Currently, the ISC control system does not have any external links. External threats to the Control System Network include both directed threats/attacks as well as general threats that may be termed mischievous in nature. Note that an external attack may not necessarily need to "take control" of the system to be effective; a denial of service attack which prevents proper operation of the control system by ships force and prevents them from controlling the ship would be an effective method of interference. This is an unacceptable risk for both operational and political considerations. As can be readily appreciated such systems are so critical that absolutely no hacker risk, however remote, is acceptable.

Network links utilize full duplex communications links. Both a transmit path and receive path exist at both ends of a network link, whether it is over optical fiber or a copper cable such as cat 5, there is a two way path for communications. This allows for two-way communications as well as the handshaking required by connection oriented protocols such as Transmission Control Protocol (TCP).

By using the isolation box of the present invention to transmit from a critical network, that requires strong protection from hackers, to an external network, it is possible to distribute information and yet prevent an attack on the control system or other critical network. The return path would physically not exist from the external network back to the control system, so connection oriented protocols would not be able to use the link, but security would be exceptionally robust. This method would remove external users from the realm of security concerns, it would require an internal user to compromise the system, which is the same threat that exists today with the current internal control system network without external connection. This would improve data distribution without increasing risk to the system and the ship.

Since connection oriented protocols would not work, a connectionless protocol would be used. Though, the protocol is connectionless, so no acknowledgements of packets received goes back and forth, there still has to be a physical connection; the switch or NIC card has to believe that there is something there, or it won't transmit data out.

The ISC control system uses UDP as the native protocol for data distribution throughout the network for control system status. By connecting the protected network 10, as in FIG. 3, from one of the control system network switch chassis, to the isolation box 20 that has external connectivity 40, the information available on the control system network may be effectively and safely transmitted to external activities that may be interested in the data. The UDP broadcast traffic will be provided in it's entirety to the external network. While the broadcast data contains all the machinery plant status information, there is also some information distribution on the system that is provided by a Simple Network Management Protocol (SNMP) application that is not broadcast in nature. In addition, other monitoring systems gather and store some log data via handheld devices that are distributed in a peer-to-peer format that is not broadcast oriented. Simply hooking a single fiber to the network switch and pumping out all broadcast data would not distribute the SNMP data and all of the other available data.

Figure 4:
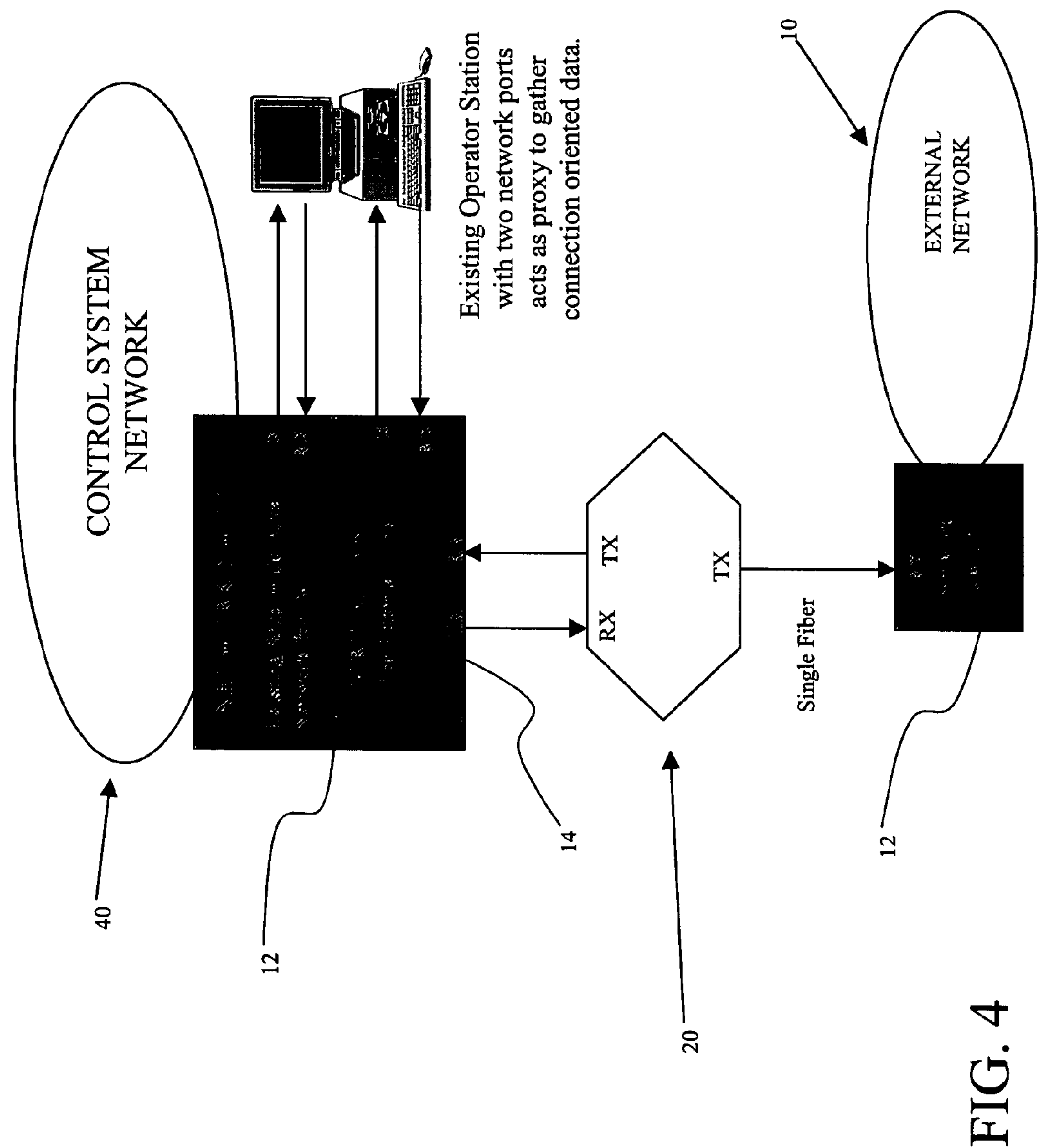
FIG. 4 is a schematic of an example of the present invention applied to a control system network.

The ISC workstations utilize a VME Bus architecture with a PCI mezzanine card (PMC) network interface port that is available for use. The PMC card has two 10 Base FL interfaces available, one of which is being used; the second port may be connected to a separate network and use the operator station to filter the broadcast traffic that it receives to remove any unwanted information. The workstation can also act as a proxy for the broadcast to the isolation box 20 by gathering the SNMP data, gathering other monitoring data (periodically), and packaging the SNMP and other data in a UDP format. The compiled data can be sent by a broadcast UDP transmission from the operator station to the network switch and then externally via the isolation box 20 and single fiber 36 transmission. As shown in FIG. 4, the "second" network is actually formed using existing network hardware. A fiber cable may be run from one of the ISC workstations to a network switch that is part of the ISC network. The network switches 12 that are installed as a part of the ISC system have the capability to create Virtual LANs 14 within the switch 12, that is to segment network data based on several available parameters such as type of traffic or physical port. By assigning the unused network interface port on the operator station to a new network address, and connecting the operator station and the isolation box 20 to their own Virtual LAN, the existing hardware can safely and securely transmit all of the data that is of interest on the network, whether it is of a broadcast or unicast nature. The ISC network switches 12 have 10 megabit per second, 10 Base FL, interface ports for workstations and DAU's. The average broadcast traffic on the network is approximately 930,000 bits per second, or an average utilization of about 9% of the existing 10 Base FL links. While this is not an issue for an Ethernet link, external communications links available on most ships are typically less than Ethernet speeds. The off-ship bandwidth available is both limited and used by many different competing applications; therefore the available bandwidth would not be able to handle anything near 930 kbits per second. Since the off ship links are intended to distribute status, and not perform control, the rate of transmission of data can be much lower. A complete snapshot of the machinery control status can be accomplished by transmitting Ethernet packets containing a total of 37,056 bits, composed of one packet from each DAU on the network. The complete status can be updated once every 10 seconds with an available transmission rate of 3,706 bits/second, or once every 30 seconds with an available transmission rate of 1,236 bits/second. The amount of data being transmitted can also be decreased by combining the data from several DAU's into a single Ethernet packet to eliminate transmission overhead. The SNMP, and other connection oriented data that may be transmitted can also be added in and effectively transmitted via the available external communications links by managing the update rates.

While there have been described what are believed to be the preferred embodiments of the present invention, those skilled in the art will recognize that other and further changes and modifications may be made thereto without departing from the spirit of the invention, and it is intended to claim all such changes and modifications that fall within the true scope of the invention.

What is claimed is:

1. A computer communications system comprising interface apparatus; said interface apparatus being for interfacing between a first computer system and a second computer system; each said computer system being one of a computer workstation and a computer network; said interface apparatus being characterized by duplex physical transmission line communication with respect to said first computer system, and by single physical transmission line communication with respect to said second computer system; said interface apparatus including a signal generator, a first physical transmission line, and a second physical transmission line; said signal generator being for transmitting simulation signals via said first physical transmission line to said first computer system; said first transmission line being for connecting said first computer system and said signal generator; said second physical transmission line being for connecting said first computer system and said second computer system; said simulation signals being received by said first computer system so as to simulate return signals that would be received by said first computer system from said second computer system if said first computer system and said second computer system were engaging in two-way communication; said simulation signals thereby encouraging said first computer system to transmit information signals via said second physical transmission line to said second computer system; said first computer system and said second computer system engaging in one-way communication, via said second physical transmission line, from said first computer system to said second computer system; said second computer system being incapable of transmitting any signals to said first computer system because of the absence of any said physical transmission line, other than said second physical transmission line, that connects said first computer system and said second computer system.

2. The computer communications system of claim 1, wherein at least one of said first physical transmission line and said second physical transmission line is an optical fiber.

3. The computer communications system of claim 1, wherein at least one of the following obtains:

said first computer system and said second computer system are each a computer workstation;

said first computer system and said second computer system are each a computer network;

said first computer system is a computer workstation and said second computer system is a computer network;

said first computer system is a computer network and said second computer system is a computer workstation.

4. The computer communications system of claim 3, wherein at least one of said first physical transmission line and said second physical transmission line is an optical fiber.

5. The computer communications system of claim 1, the computer communications system further comprising a third said computer system, which acts as a proxy for said first computer system; said third computer system gathering information signals, received from said first computer system, that use a connection-oriented protocol; said third computer system converting said information signals that use a connection-oriented protocol to information signals that use a connectionless protocol; said third computer transmitting said information signals that use a connectionless protocol to said second computer system via said second physical transmission line.

6. The computer communications system of claim 1, the computer communications system further comprising at least one of said first computer system and said second computer system, wherein at least one of the following obtains:

said first computer system and said second computer system are each a computer workstation;

said first computer system and said second computer system are each a computer network;

said first computer system is a computer workstation and said second computer system is a computer network;

said first computer system is a computer network and said second computer system is a computer workstation.

7. The computer communications system of claim 6, wherein at least one of said first physical transmission line and said second physical transmission line is an optical fiber.

8. The computer communications system of claim 6, the computer communications system further comprising a third said computer system that acts as a proxy for said first computer system, said third computer system gathering information signals, received from said first computer system, that use a connection-oriented protocol; said third computer system converting said information signals that use a connection-oriented protocol to information signals that use a connectionless protocol; said third computer transmitting said information signals that use a connectionless protocol to said second computer system via said second physical transmission line.

9. The computer communications system of claim 8, wherein at least one of said first physical transmission line and said second physical transmission line is an optical fiber.

10. A computer communications system comprising interface apparatus, said interface apparatus being for interfacing between a first computer system and a second computer system, each said computer system being one of a computer workstation and a computer network, said interface apparatus being characterized by duplex physical transmission line communication with respect to said first computer system and by single physical transmission line communication with respect to said second computer system, said first computer system and said second computer system engaging in one-way communication via said interface apparatus, said one-way communication being from said first computer system to said second computer system, said interface apparatus including:

a first physical transmission line, for connecting said first computer system and a first signal generator;

a second physical transmission line, for connecting a media converter unit and a second signal generator, a third physical transmission line, for connecting said first computer system and said media converter unit;

a fourth physical transmission line, for connecting said second computer system and said media converter unit;

said media converter unit, for receiving first-format information signals via said third physical transmission line from said first computer system, said first-format information signals having a first speed, said media converter unit converting said first-format information signals to second-format information signals, said second-format information signals having a second speed;

said first signal generator, for transmitting first simulation signals via said first physical transmission line to said first computer system, said first simulation signals comporting with said first-format information signals, said first simulation signals being received by said first computer system so as to simulate return signals that would be received by said first computer system if said first computer system and said second computer system were engaging in two-way communication with a separate electronic device, said first simulation signals thereby encouraging said first computer system to transmit said first-format information, signals via said third physical transmission line to said media converter unit; and said second signal generator, for transmitting second simulation signals via said second physical transmission line to said media converter unit, said second simulation signals comporting with said second-format information signals, said second simulation signals being received by said media converter unit so as to simulate return signals that would be received by said media converter unit if said first computer system and said second computer system were engaging in two-way communication with a separate electronic device, said second simulation signals thereby encouraging said media converter unit to transmit said second-format information signals via said fourth physical transmission line to said second computer system;

wherein said third physical transmission line, said media converter unit, and said fourth physical transmission line together constitute the only communication path between said first computer system and said second computer system, said only communication path enabling said one-way communication from said first computer system to said second computer system, said second computer system being incapable of transmitting any signals to said first computer system due to the absence of any return communication path from said second computer system to said first computer system.

11. The computer communications system of claim 10, wherein at least one of said first physical transmission line, said second physical transmission line, said third physical transmission line, and said fourth physical transmission line is an optical fiber.

12. The computer communications system of claim 11, wherein at least one of the following obtains:

said first computer system and said second computer system are each a computer workstation;

said first computer system and said second computer system are each a computer network;

said first computer system is a computer workstation and said second computer system is a computer network;

said first computer system is a computer network and said second computer system is a computer workstation.

13. The computer communications system of claim 12, wherein at least one of said first physical transmission line, said second physical transmission line, said third physical transmission line, and said fourth physical transmission line is an optical fiber.

14. The computer communications system of claim 10, wherein:

said computer communications system further comprise a third said computer system, which acts as a proxy for said first computer system;

said third computer system gathers information signals, received from said first computer system, that use a connection-oriented protocol;

said third computer system converts said information signals that use a connection-oriented protocol to information signals that use a connectionless protocol;

said third computer system transmits said information signals that use a connectionless protocol to said second computer system via said fourth physical transmission line.

15. The computer communications system of claim 10, the computer communications system further comprising at least one of said first computer system and said second computer system, wherein at least one of the following obtains:

said first computer system and said second computer system are each a computer workstation;

said first computer system and said second computer system are each a computer network;

said first computer system is a computer workstation and said second computer system is a computer network;

said first computer system is a computer network and said second computer system is a computer workstation.

16. The computer communications system of claim 10, the computer communications system further comprising a third said computer system that acts as a proxy for said first computer system, said third computer system gathering information signals, received from said first computer system, that use a connection-oriented protocol; said third computer system converting said information signals that use a connection-oriented protocol to information signals that use a connectionless protocol; said third computer transmitting said information signals that use a connectionless protocol to said second computer system via said second physical transmission line.

17. The apparatus for interfacing as defined in claim 10, wherein:

said media converter unit includes a first media converter device and a second media converter device that are connected to each other;

said first computer system and said first media converter device are connected via said third physical transmission line;

said second computer system and said second media converter device are connected via said fourth physical transmission line;

said second signal generator and said second media converter device are connected via said second physical transmission line.

18. A method for interfacing between a first computer system and a second computer system so as to isolate said first computer system from said second computer system, each said computer system being one of a computer workstation and a computer network, said method comprising:

connecting said first computer system and a signal generator via a first transmission line;

connecting said first computer system and said second computer system via said second transmission line; and transmitting simulation signals via said first physical transmission line to said first computer system, said transmitting of simulation signals including using a signal generator, said simulation signals being received by said first computer system so as to simulate return signals that would be received by said first computer system from said second computer system if said first computer system and said second computer system were engaging in two-way communication, said simulation signals thereby encouraging said first computer system to transmit information signals via said second physical transmission line to said second computer system;

said interfacing being characterized by duplex physical transmission line communication with respect to said first computer system and by single physical transmission line communication with respect to said second computer system, said second physical transmission line constituting the only communication path between said first computer system and said second computer system, said only communication path enabling one-way communication from said first computer system to said second computer system, said second computer system being incapable of transmitting any signals to said first computer system due to the absence of any return communication path from said second computer system to said first computer system.

19. The method for interfacing of claim 18, the method further comprising connecting a third said computer system to said first computer system so that said third computer system acts as a proxy for said first computer system, said third computer system gathering information signals, received from said first computer system, that use a connection-oriented protocol, said third computer system converting said information signals that use a connection-oriented protocol to information signals that use a connectionless protocol, said third computer transmitting said information signals that use a connectionless protocol to said second computer system via said second physical transmission line.

20. The method of claim 18, wherein at least one of the following obtains:

said first computer system and said second computer system are each a computer workstation;

said first computer system and said second computer system are each a computer network;

said first computer system is a computer workstation and said second computer system is a computer network;

said first computer system is a computer network and said second computer system is a computer workstation.

* * * * *